(12) United States Patent
Choudhary et al.

(10) Patent No.: US 12,222,881 B2
(45) Date of Patent: Feb. 11, 2025

(54) LOGICAL PHYSICAL LAYER INTERFACE SPECIFICATION SUPPORT FOR PCie 6.0, CXL 3.0, AND UPI 3.0 PROTOCOLS

(71) Applicant: Intel Corporation, Santa Clara, CA (US)

(72) Inventors: Swadesh Choudhary, Mountain View, CA (US); Mahesh Wagh, Portland, OR (US); Debendra Das Sharma, Saratoga, CA (US)

(73) Assignee: INTEL CORPORATION, Santa Clara, CA (US)

( * ) Notice: Subject to any disclaimer, the term of this patent is extended or adjusted under 35 U.S.C. 154(b) by 749 days.

(21) Appl. No.: 17/231,152

(22) Filed: Apr. 15, 2021

(65) Prior Publication Data

US 2021/0232520 A1 Jul. 29, 2021

Related U.S. Application Data

(60) Provisional application No. 63/137,045, filed on Jan. 13, 2021.

(51) Int. Cl.
*G06F 13/38* (2006.01)
*G06F 11/10* (2006.01)
*G06F 13/40* (2006.01)

(52) U.S. Cl.
CPC ........ *G06F 13/382* (2013.01); *G06F 11/1048* (2013.01); *G06F 13/4018* (2013.01); *G06F 13/4059* (2013.01); *G06F 13/4068* (2013.01)

(58) Field of Classification Search
CPC ............... G06F 13/382; G06F 11/1048; G06F 13/4018; G06F 13/4059; G06F 13/4068
See application file for complete search history.

(56) References Cited

U.S. PATENT DOCUMENTS

| | | | |
|---|---|---|---|
| 7,395,483 B1 * | 7/2008 | Tourancheau | H03M 13/09 714/776 |
| 2002/0172164 A1 * | 11/2002 | Chou | H04L 1/1671 370/429 |
| 2016/0179710 A1 * | 6/2016 | Das Sharma | G06F 13/1642 710/310 |
| 2016/0188500 A1 | 6/2016 | Morris et al. | |
| 2017/0097867 A1 | 4/2017 | Glaser et al. | |

(Continued)

OTHER PUBLICATIONS

U.S. Appl. No. 17/128,648, filed Dec. 21, 2020, entitled "System, Apparatus and Method for Handling Multi-Protocol Traffic in Data Link Layer Circuitry," by Nitish Paliwal. (3878).

(Continued)

*Primary Examiner* — Phong H Dang
(74) *Attorney, Agent, or Firm* — Eversheds Sutherland (US) LLP

(57) ABSTRACT

In one embodiment, an apparatus includes: a first link layer circuit to perform link layer functionality for a first communication protocol; and a logical physical (logPHY) circuit coupled to the first link layer circuit via a logical PHY interface (LPIF) link, the logPHY circuit to communicate with the first link layer circuit in a flit mode in which the first information is communicated in a fixed width size and to communicate with another link layer circuit in a non-flit mode. Other embodiments are described and claimed.

19 Claims, 16 Drawing Sheets

(56) References Cited

U.S. PATENT DOCUMENTS

| | | | |
|---|---|---|---|
| 2018/0095923 A1* | 4/2018 | Iyer | G06F 13/4022 |
| 2018/0196710 A1* | 7/2018 | Iyer | H04L 1/0061 |
| 2020/0012555 A1* | 1/2020 | Das Sharma | G06F 11/1402 |
| 2020/0186414 A1 | 6/2020 | Sharma | |
| 2020/0226091 A1* | 7/2020 | Harriman | G06F 13/4282 |
| 2020/0293480 A1 | 9/2020 | Iyer et al. | |
| 2020/0394150 A1 | 12/2020 | Lanka et al. | |
| 2021/0232520 A1 | 7/2021 | Choudhary et al. | |
| 2022/0004453 A1* | 1/2022 | Wong | H04L 67/06 |

OTHER PUBLICATIONS

Intel Corporation, Logical PHY Interface (LPIF) Specification, Version 1, Mar. 23, 2019, pp. 1-63.
Netherlands Patent Office, Office Action dated Mar. 28, 2023 in Netherlands Patent Application No. 2029960 (16 pages).
Das Sharma, "PCI Express® 6.0 Specification at 64.0 GT/s with PAM-4 signaling: a low latency, high bandwidth, high reliability and cost-effective interconnect," 2020 IEEE Symposium on High-Performance Interconnects (HOTI), Piscataway, NJ, USA, 2020, pp. 1-8.
Patent Cooperation Treaty, International Search Report and Written Opinion mailed Jan. 5, 2022 in PCT Application No. PCT/US2021/050772 (12 pages).

* cited by examiner

FIG. 6A

| Byte | | |
|---|---|---|
| 0 | 2B (res. for aggr.) | 62B (from Link Layer) |
| 64 | 58B (from Link Layer) | 6B (res. for logPHY) |
| 128 | 64B (from Link Layer) | |
| 192 | 58B (from Link Layer) | 6B (res. for logPHY) |
| 256 | 64B (from Link Layer) | |
| 320 | 58B (from Link Layer) | 6B (res. for logPHY) |
| 384 | 64B (from Link Layer) | |
| 448 | 52B (from Link Layer) | 12B (res. for logPHY) |

FIG. 6B

CXL.IO

| Byte | | |
|---|---|---|
| 0 | 2B (rsvd for logPHY) | 62B (from Link Layer) |
| 64 | 64B (from Link Layer) | |
| 128 | 64B (from Link Layer) | |
| 192 | 46B (from Link Layer) | 4B DLP | 14B (rsvd for logPHY) |

CXL.CacheMem

| Byte | | |
|---|---|---|
| 0 | 2B (rsvd for logPHY) | 62B (from Link Layer) |
| 64 | 64B (from Link Layer) | |
| 128 | 64B (from Link Layer) | |
| 192 | 50B (from Link Layer) | 14B (rsvd for logPHY) |

FIG. 6E

CXL.IO

| Byte | | | |
|---|---|---|---|
| 0 | 2B (rsvd for logPHY) | 62B (from Link Layer) | |
| 64 | 58B (from Link Layer) | | 6B (rsvd for logPHY) |
| 128 | 64B (from Link Layer) | | |
| 192 | 48B (from Link Layer) | 4B DLP | 12B (rsvd for logPHY) |

CXL.CacheMem

| Byte | | | |
|---|---|---|---|
| 0 | 2B (rsvd for logPHY) | 62B (from Link Layer) | |
| 64 | 58B (from Link Layer) | | 6B (rsvd for logPHY) |
| 128 | 64B (from Link Layer) | | |
| 192 | 52B (from Link Layer) | | 12B (rsvd for logPHY) |

FIG. 6F

LOGICAL PHYSICAL LAYER INTERFACE SPECIFICATION SUPPORT FOR PCie 6.0, CXL 3.0, AND UPI 3.0 PROTOCOLS

This application claims priority to U.S. Provisional Patent Application No. 63/137,045, filed on Jan. 13, 2021, in the names of Swadesh Choudhary, Mahesh Wagh, Debendra Das Sharma, entitled LOGICAL PHYSICAL LAYER INTERFACE SPECIFICATION SUPPORT FOR PCIE 6.0, CXL 3.0, AND UPI 3.0 PROTOCOLS, the disclosure of which is hereby incorporated by reference.

TECHNICAL FIELD

Embodiments of the present disclosure generally relate to the field of computing, in particular to logical physical layer interface specification support for protocols.

BACKGROUND

Logical physical layer (PHY) interface specifications are used to define interfaces for protocols to facilitate device interoperability.

BRIEF DESCRIPTION OF THE DRAWINGS

FIGS. 6A-6F are diagrams showing example flit formats, in accordance with various embodiments.

DETAILED DESCRIPTION

Figure 1:
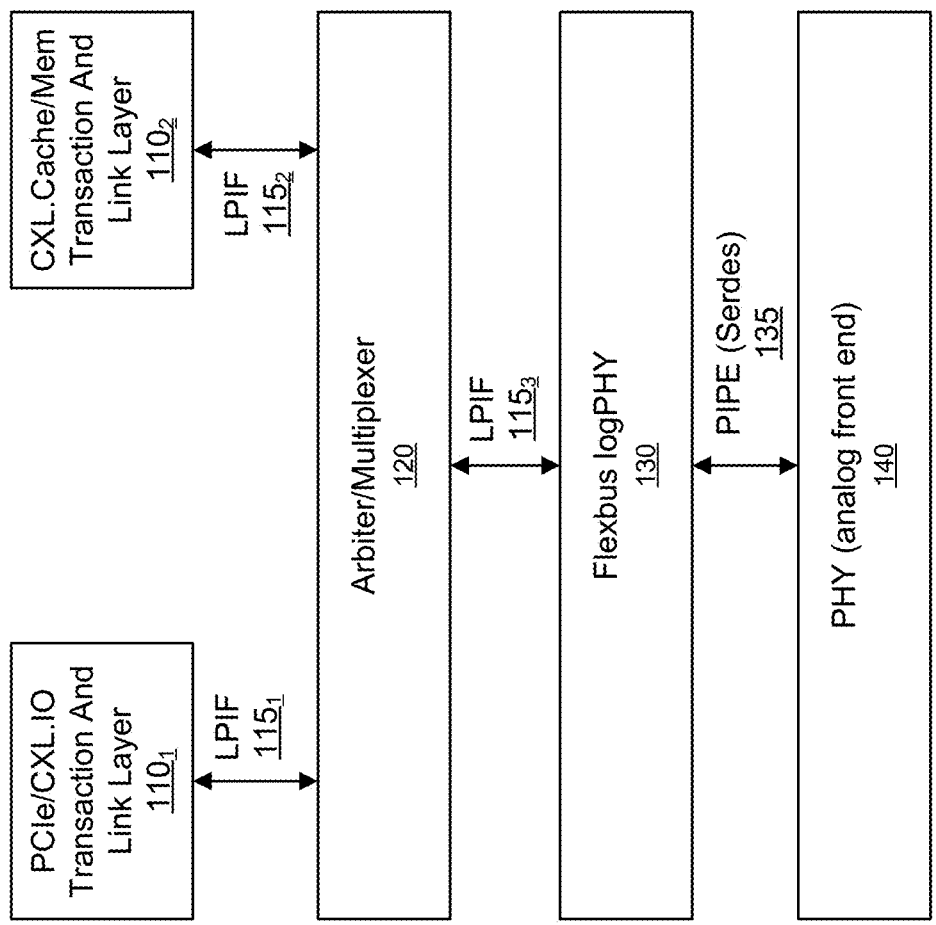
FIG. 1 is a diagram representation functionality partitioning of the logical PHY interface (LPIF) specification, in accordance with various embodiments.

In various embodiments, a common media access control (MAC) layer may be provided that can interface with protocol stacks of different communication protocols. Stated another way, a single MAC unit may be provided within an integrated circuit that can interface with circuitry communicating via different communication protocols. As a result, embodiments provide a standard mechanism for link layer interfacing, allowing flexibility of one or more link layers connecting to the MAC unit.

In addition, the single MAC unit may be used for communicating information in different modes of operation. More particularly herein, in a first mode, information may be communicated in a so-called flit mode, where a flit is a flow control unit of information that has a fixed width for a given communication protocol definition. Further, in a second mode, information may be communicated in a non-flit mode, where information may have a variable width for a given communication protocol definition.

In particular embodiments herein, this MAC may interface with upper layers, and more particularly, multiple different link layers via a common interface. In embodiments, this interface may be in accordance with an Intel® Logical PHY Interface (LPIF) specification, e.g., a given version of this specification, such as may be implemented in a system having enhancements to the original LPIF specification version 1.1 (published September 2020), or future versions or revisions to this specification.

Embodiments described herein may be directed to enhancements to the LPIF specification, including changes to support protocols including: Peripheral Component Interconnect Express (PCie) version 6.0 (forthcoming), Compute Express link (CXL) version 3.0 (forthcoming), and Intel® Ultra-Path Interconnect (UPI) version 3.0. Embodiments described herein may be used to define and support a logical physical layer (logical PHY or logPHY) interface that spans support over multiple protocols across all the specification revisions of the protocols, and allows a common protocol layer stack across different physical layers, for example device to device (d2d) or PCIe PHY.

Embodiments described herein may include enhancements to the legacy LPIF that had several mechanisms at the interface level, and outline functionality partitioning to provide improved latency and area characteristics, while maintaining backward compatibility with previous versions of the protocols. These embodiments may provide a common cyclical redundancy check (CRC) and/or retry logic for stacks that support PCIe 6.0, CXL 3.0 and/or UPI 3.0 flit modes, low latency mechanisms for late cancel of flits, mechanisms for efficient dynamic clock gating of the protocol stack, performance tuning indications from logical PHY to the protocol layer, and backward compatibility with previous revisions.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a diagram representation functionality partitioning of the logical PHY interface (LPIF) specification, in accordance with various embodiments. The Logical PHY Interface (LPIF) specification defines a common interface between the link layer and a logical physical layer (logPHY) to facilitate interoperability, design, and validation reuse between link layers and a physical layer. Two different modes are supported: a flit mode; and a non-flit mode As shown in FIG. 1, an apparatus 100 may include one or more integrated circuits to perform various functionality within a given system. To provide for communication via a link (not shown in FIG. 1), multiple upper layers of different protocol stacks may be provided. Specifically as shown in FIG. 1, these upper layers may include transaction and link layers. Each combination of a transaction layer and a link layer may enable processing of information to be communicated to and from circuitry that may execute applications or so forth.

In the implementation of FIG. 1, multiple transaction and link layers 110 may be provided, each of which may be used to enable communication according to one or more communication protocols. Specifically as shown in FIG. 1, transaction and link layer 1101 may be used for communication of PCIe/CXL.I/O traffic, while in turn transaction and link layer 1102 may be used for communication of CXL-.cache/mem traffic. Understand while only 2 separate transaction and link layers are shown, more may be present in a particular embodiment.

In turn, transaction and link layers 110 couple by way of links $115_{1-2}$, which may be LPIF interfaces in accordance with an embodiment, to an arbiter/multiplexer 120. Arbiter/multiplexer 120 may act as a selection circuit to selectively route communications to and from these upper layers and in turn with a logPHY circuit 130, which in an embodiment may be implemented as a Flexbus logPHY circuit.

In general, logPHY circuit 130 may be considered media access control (MAC) layer circuitry, as it performs functionality including link control, data coding, scrambling and so forth. And as used herein, the terms "MAC" and "logPHY" may be used interchangeably to refer more generally to MAC layer circuitry.

As shown in FIG. 1, arbiter/multiplexer 120 couples to logPHY circuit 130 via a another LPIF interface 1153. In turn, logPHY circuit 130 may communicate according to a PHY Interface For PCIe (PIPE) communication protocol (such as in accordance with the PIPE specification version 5.0 (published November 2017) or another version thereof) with a PHY circuit 140, which may provide an analog front end. Such communications may occur according to a serialization/deserialization (SERDES) architecture, in an embodiment. In some implementations, each block in the multiple protocol implementation may interface with another block via an independent LPIF interface.

Although not shown at a high level of FIG. 1, understand that PHY circuit 140 may communicate with one or more remote link partners via a link, which may be a die-to-die link, e.g., implemented on a circuit board as an example.

In embodiments, transaction and link layers 110 may perform functionality including providing a protocol transaction layer, a data link layer, and flit packing/unpacking.

Note that certain functionality may be implemented in different locations, depending upon a selected communication protocol. For example, for non-flit mode of operation such as for CXL 1.1, 2.0, and PCIe non-flit modes, error detection and replay functionality may be implemented within transaction and link layer 1101. Also in a flit mode for PCIe, no operation (NOP) flit insertion may be implemented within transaction and link layer 1101. Similar functionality may be performed in transaction and link layer 1102.

In an embodiment, logPHY circuit 130 may provide may perform functionality including link training and status state machines, deskew and state insertions, lane reversal and lane degradation, scrambling/descrambling, formatting into certain encodings (e.g., 8 b/10 b, 128 b/130 b) when applicable and providing an elastic buffer. Still further, for flit mode operations, such as for PCIe flit mode and CXL 3.0, logPHY circuit 130 may implement error correction detection and correction, such as by way of cyclic redundancy checksum and forward error correction), as well as replay functionality.

In an embodiment, PHY circuit 140 may perform functionality including providing analog buffers, receiver detection, power sequencing, and SERDES communication.

In flit mode, the transfer across the LPIF interface is always a fixed flit size. A flit can take multiple clock cycles of data transfer (depending on flit size and data bus width). Examples of such protocols are PCie 6.0 Flit mode, CXL 1.1 onwards, die-to-die transfers, and UPI 3.0. The flit definitions are protocol specific, and it is permitted to have reserved bits within the flit that are populated by logPHY—these are driven to a logic zero the link layer. It is permitted for a protocol to have multiple flit types that are predefined and understood by link layer and logPHY. In an embodiment, logPHY circuit 130 may use encodings on a format indication signal, pl_protocol_flitfmt, to indicate which flit format the link layer is to use.

In non-flit mode, the transfer across the LPIF interface is not always a fixed flit size. PCIe 1.0 to 5.0 (non-flit mode) is an example of such a protocol. Depending on intended usage, applications are permitted to support only a single mode at design compile time (for example die-to-die transfers), or this mode can be a negotiated setting indicated by the logPHY on pl_protocol_flitmode signal (as in the case of PCIe). When running multiple protocols, there may be an additional arbitration and multiplexer layer in between the link layer and the physical layer. Each instance in the multiple protocol implementation has its independent LPIF interface. In cases where bifurcation is supported, each bifurcated port has its own independent LPIF interface.

While embodiments are described in connection with a CXL-based system, embodiments are not limited in this regard. Further while one example use case is for a cloud-based architecture that may communicate using interconnects and switches in accordance with a CXL specification or any future versions, modifications, variations or alternatives, other implementations are possible. For example embodiments may be used in other coherent interconnect technologies such as an IBM XBus protocol, an Nvidia NVLink protocol, an AMD Infinity Fabric protocol, cache coherent interconnect for accelerators (CCIX) protocol or coherent accelerator processor interface (OpenCAPI).

In a CXL implementation, traffic flows of different communication protocols are sent along CXL interconnects. For example, there may be separate traffic flows including so-called CXL.cache, CXL.io and CXL.mem communication protocols via which traffic of different communication protocols is communicated. More generally, the interconnect may support various interconnect protocols, including a non-coherent interconnect protocol, a coherent interconnect protocol, and a memory interconnect protocol. Non-limiting examples of supported interconnect protocols may include PCI, PCIe, USB, IDI, IOSF, SMI, SMI3, SATA, CXL.io, CXL.cache, and CXL.mem, and/or the like.

While examples discussed herein may reference the use of LPIF-based link layer-logical PHY interfaces, it should be appreciated that the details and principles discussed herein may be equally applied to non-LPIF interfaces. Likewise, while some examples may reference the use of common link layer-logical PHY interfaces to couple a PHY to controllers that implement CXL or PCIe, other link layer protocols may also make use of such interfaces. Similarly, while some references may be made to Flex Bus physical layers, other physical layer logic may likewise be employed in some implementations and make use of common link layer-logical PHY interfaces, such as discussed herein, among other example variations that are within the scope of the present disclosure.

With advancements in multi-chip packaging (MCP) technologies, multiple silicon dies can be included within the same package. High density, low latency die-to-die interconnects, optimized for short reach, are capable of very low bit error rates (BER), such that these interconnects typically omit the overhead of serializer/deserializer (SERDES) circuitry, as well as synchronization related to package trace transmission and also omit the overhead of a complicated link training and status state machine in the logical PHY.

Various, different protocols (e.g., CXL, PCIe, UPI, among others) may benefit from a generic logical PHY interface to enable use of die-to-die interconnect, with the generic logical PHY interface (or adapter) serving as a transport mechanism that abstracts handshakes for initialization, power management and link training.

With embodiments, logPHY circuit 130 may be provided to implement a generic logical PHY that allows upper protocol layers (e.g., link layers) to be transported over a variety of different die-to-die fabric blocks. The adapter may enable a raw bit stream to be transported over a die-to-die interface that uses a subset of a common link layer-to-PHY interface protocol (e.g., LPIF). Potentially any die-to-die electrical interface may make use of such an interface through the provision of such adapters. In some implementations, the adapter may utilize a subset of a defined common link layer-to-PHY interface (such as LPIF) to which existing link layer circuits may couple.

FIG. 1 shows a representation of the functionality partitioning. Additional embodiments of optimizations and/or mechanisms over LPIF are given below. Particularly when operation is in a flit mode, various latency optimizations may be possible. To this end a logPHY circuit in accordance with an embodiment may perform operations to optimize latency, which may improve communication mechanisms and further may reduce power consumption, e.g., in upper layers.

Figure 2:
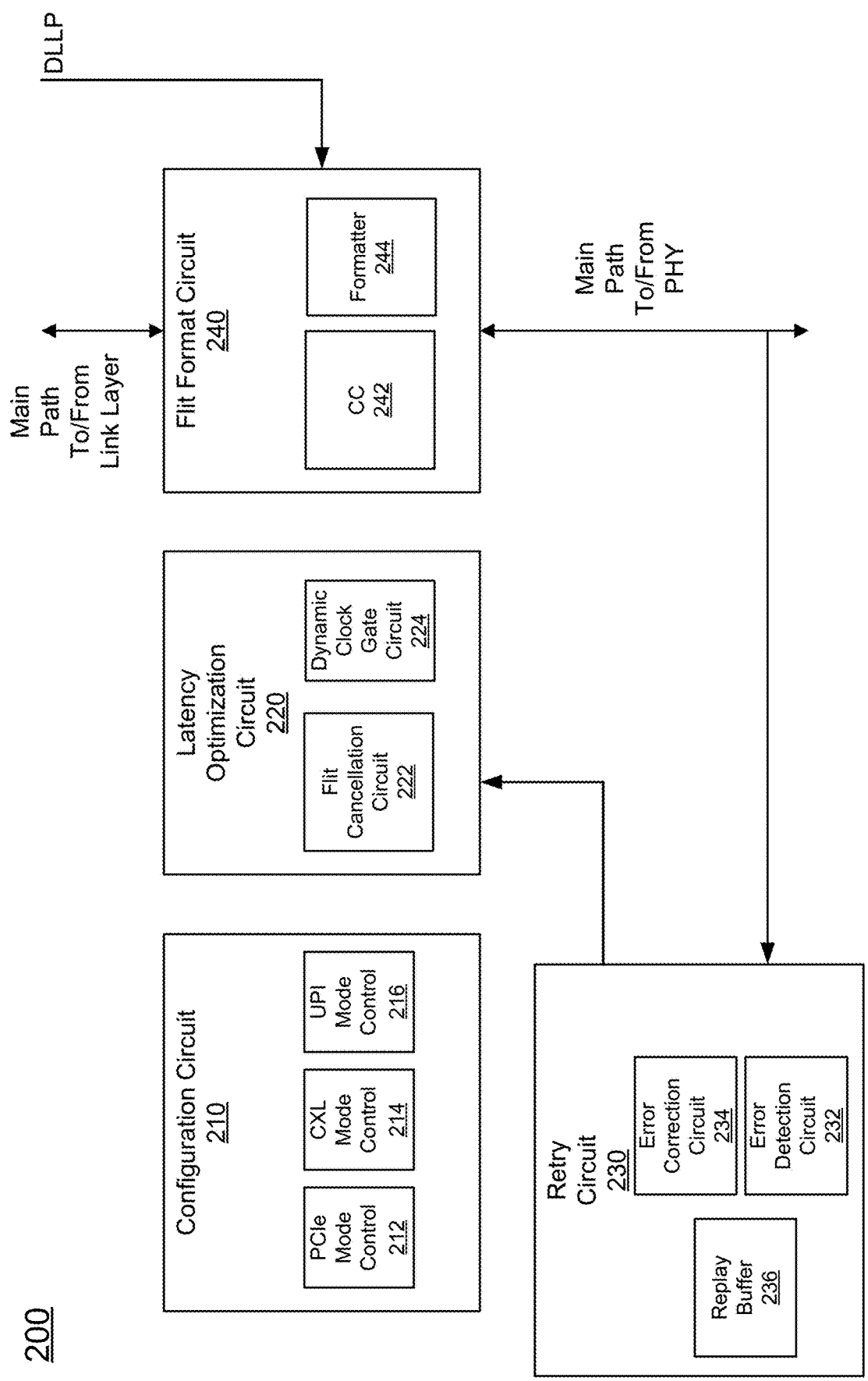
FIG. 2 is a block diagram of a logPHY circuit in accordance with an embodiment.

Referring now to FIG. 2, shown is a block diagram of a logPHY circuit in accordance with an embodiment. Understand that logPHY circuit 200 shown in FIG. 2 is at a high level to illustrate various components used to control its configuration, and be involved in negotiations with a remote link partner and upper layers to operate in a selected mode for a particular communication protocol. In addition, circuitry is provided in logPHY circuit 200 for various optimizations, as well as for handling protocol activities including replays and so forth.

Specifically as shown in FIG. 2, logPHY circuit 200 includes a configuration circuit 210. In part, configuration circuit 210 may, based on communications during a negotiation with a remote link partner, determine a communication protocol to activate as well as to identify whether communication is to be according to a flit mode or a non-flit mode. In the embodiment shown in FIG. 2, configuration circuit 210 includes various other mode control circuitry, including a PCIe mode control circuit 212, a CXL mode control circuit 214, and a UPI mode control circuit 216.

As further shown, logPHY circuit 200 also includes a latency optimization circuit 220 which may provide functionality for various optimizations. Such optimizations may include a flit cancellation process, details of which are described further herein, via a flit cancellation circuit 222. In addition, an early wake indication can be sent to a link layer, via a dynamic clock gate circuit 224.

In addition, logPHY circuit 200 also may be configured to handle replay operations. To this end, logPHY circuit 200 includes a retry circuit 230, which may include a replay buffer 236. Such replay buffer 236 may store incoming information in order to provide a source for replay. In addition, retry circuit 230 also includes at least one error detection circuit 232, which may be configured to perform error detection on incoming communications. As an example, incoming communications may be error correction coded (ECC), such that error detection circuit 232 may perform error checking, such as a cyclic redundancy checksum (CRC) process. If an error is detected in an incoming communication, an error correction circuit 234 may attempt to correct the error, e.g., using a forward error correction (FEC) process. In implementations herein, if an error is detected, retry circuit 230 may communicate with latency optimization circuit 220 so that flit cancellation circuit 222 may send a signal to upper layers to cancel one or more flits for which the error was detected. If a detected error is able to be corrected, the corrected flit can be provided to the upper layers. Instead, if an error is not able to be corrected, a retry request may be sent to the remote link partner, e.g., in the form of a no acknowledgement (NAK).

Still referring to FIG. 2, a flit format circuit 240 also is present. Note that flit format circuit 240 includes a control circuit 242 that is configured to identify an appropriate flit format for a given communication protocol. In some cases, there may be multiple flit formats for a given communication protocol such that based on negotiation, a given format can be selected. Accordingly, control circuit 242 may appropriately control a formatter 244, which formats flits for communication.

In embodiments herein, upper layers may reserve certain portions of flits (e.g., given bytes in one or more cycles) for logPHY circuit 200 to insert various information, such as information obtained from data link layer packets (DLLPs), which as shown may be provided from upper layers via a sideband path to a main path. Understand while shown at this high level in the embodiment of FIG. 2, many variations and alternatives are possible.

Table 1 is a diagram showing an example LPIF specification addition to address latency optimizations in a transmit direction, in accordance with various embodiments. For the transmit direction (link layer to logPHY), for protocols that support flit mode, and support protocol layer NOP flits, it may be required for link layer to support NOP flit insertion when the state status is Active but not Active.L0p. This may allow the link layer to do latency optimizations and start flit headers in the middle of a flit (as long as flit framing rules allow it). The intent is that logPHY should not need to know anything about protocol specific flit framing. When the state status is Active.L0p, it may be permitted for logPHY to insert NOP flits to allow more opportunities for link layer dynamic clock gating. For protocols CXL1.1 and CXL2.0, there are no NOP flits and Idle flits are inserted by logPHY.

Table 1 shows an example of a signal description of an indication from a link layer.

TABLE 1

| lp_nop_flit | Per Port | Link layer indication to the logPHY that a flit is NOP and it must not be put in the Tx Replay Buffer. In cases where a flit transfer takes multiple clock cycles, this signal must only be asserted for the last chunk transfer of the corresponding flit. NOP flit definition is protocol specific. This signal is not applicable for CXL1.1 and CXL2.0 or when pl_protocol_flitmode = 0 (logPHY must ignore it). |
|---|---|---|

Figure 3:
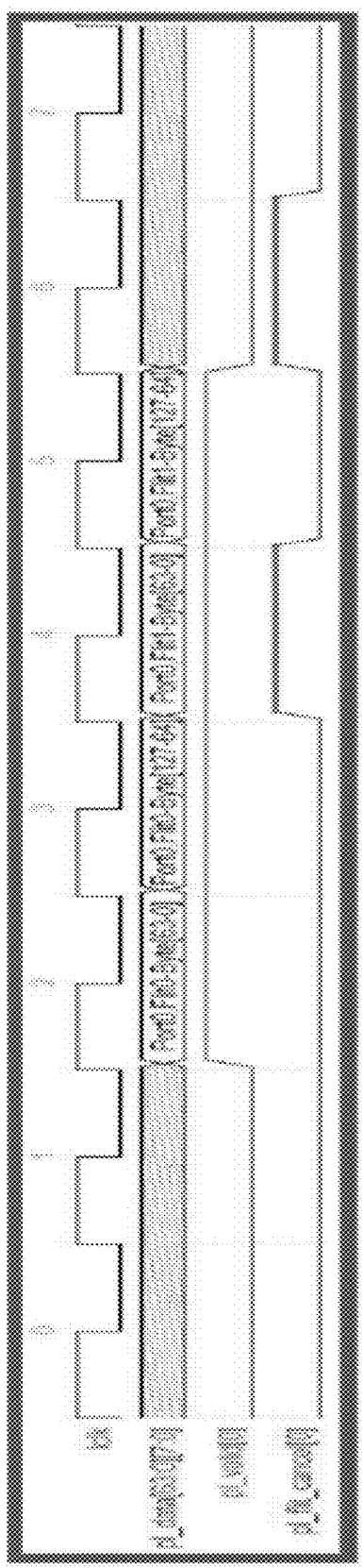
FIG. 3 is a diagram showing an 8 bit word and associated properties of latency optimizations in a receive direction, in accordance with various embodiments.

FIG. 3 is a diagram showing an 8 bit word and associated properties of latency optimizations in a receive direction, in accordance with various embodiments. With respect to the receive direction, (logPHY to link layer): For the receive path there may be an optional mechanism to allow logPHY to perform latency optimizations by giving an indication to cancel a flit that has been previously sent. This may occur, in a non-limiting example, in cases where CRC and the error correction (FEC) checks are to be performed, where logPHY can forward the flit to link layer while doing CRC computation, but then cancel the flit if CRC fails. A flit cancellation signal, pl_flit_cancel, may be asserted by the logPHY for a single clock cycle to cancel a particular transmitted flit. It may have a fixed relationship (chosen at design compile time such that both logPHY and link layer expect the same relationship) with the last cycle of flit transfer. This can be either 1 cycle or 2 cycles after the last cycle of flit transfer. This implies that if it takes multiple cycles to transfer a flit on the interface, pl_flit_cancel cannot assert for consecutive clock cycles.

FIG. 3 shows an example where 2 back-to-back flits (128 bytes (B) flits sent over a 64 B data width) are canceled for the case when the cancel is asserted one cycle after the end of a flit. If pl_flit_cancel had not asserted on clock cycle 7, the link layer consumes Flit 1. When supported, link layer supports dumping the flits for all flit formats of the protocol. It is the responsibility of the logPHY to make sure that the canceled flits are eventually replayed on the interface in the correct order.

Figure 4:
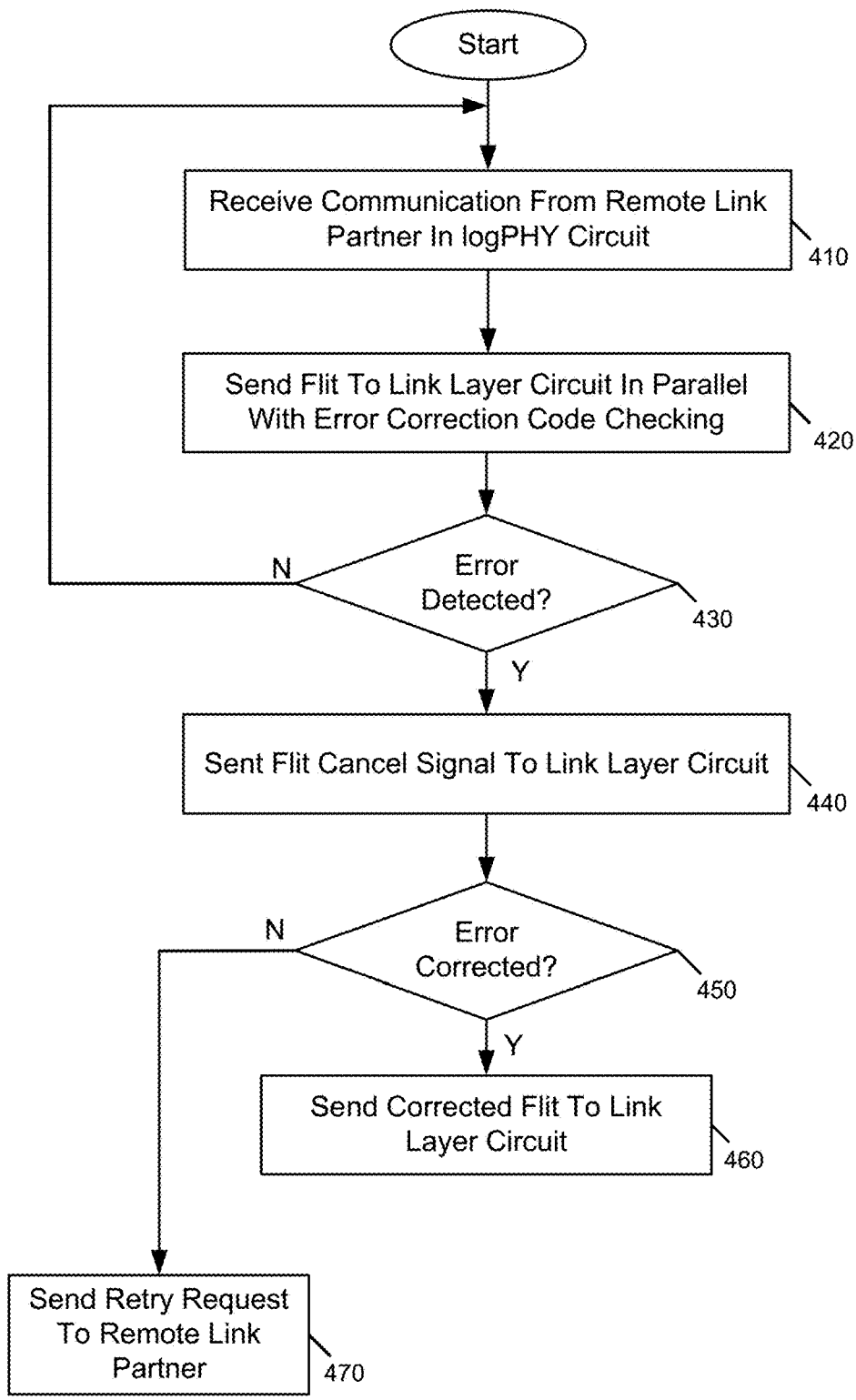
FIG. 4 is a flow diagram of a method in accordance with an embodiment.

Referring now to FIG. 4, shown is a flow diagram of a method in accordance with an embodiment. As shown in FIG. 4, method 400 is a method for performing flit cancellation when an error is detected in an incoming flit. In an embodiment, method 400 may be performed by circuitry within a logPHY circuit such as retry circuitry and optimization circuitry as described herein. More generally, embodiments may be implemented using hardware circuitry, firmware, software and/or combinations thereof.

As illustrated, method 400 begins by receiving a communication from a remote link partner in the logPHY circuit (block 410). Assume that this communication is in flit mode. During normal operation, incoming flits are passed up to an upper layer, e.g., a link layer associated with a given communication protocol. In parallel with this incoming flit processing and communication to link layer circuitry, error checking may be performed, reducing latency of forwarding incoming flits to the upper layers. Thus as shown at block 420 the flit may be sent to the link layer circuit in parallel with ECC checking. It is determined whether an error is detected (diamond 430). If not, control passes back to block 410 for further handling of incoming communications.

Otherwise if it is determined that an error is detected, at block 440 a flit cancel signal may be sent to the link layer circuit. In addition, understand that an error correction process may be performed to determine whether corrected data can be recovered within the logPHY circuit. As an example, FEC operations may be performed. Then it is determined at diamond 450 whether the error is corrected. If so, at block 460 the corrected flit can be sent to the link layer circuit. Otherwise if the error is uncorrectable, control passes to block 470 where the logPHY circuit may send a retry request to the remote link partner to request redelivery of the erroneous information.

Note that this single flit cancellation mechanism can be used in a PCIe mode in which retry can be performed for a single sequence number. Understand while shown at this high level in the embodiment of FIG. 4, many variations and alternatives are possible.

Table 2 is a diagram showing an example LPIF specification addition to address flit cancel, in accordance with various embodiments. Table 2 shows a signal description of PL_flit_cancel.

TABLE 2

| pl_flit_cancel | Per Port | Physical Layer to link layer indication to dump a flit. This is an optional signal that enables latency optimizations in the logPHY when CRC/FEC checks need to be performed on the Rx data path. It is required to have a fixed number of clock cycle delay between the last chunk of a flit transfer and the assertion of pl_flit_cancel. This delay is a compile time parameter and cannot be more than 2 cycles. When this signal is asserted, link layer must not consume the associated flit. When this mode is supported, link layer must support it for all flit formats associated with the corresponding protocol. logPHY must guarantee this to be a single cycle pulse when dumping a flit. See section 2.3.1.2.2 for more details. This signal is not applicable for CXL1.1 and CXL2.0 or when pl_protocol_flitmode = 0 (link layer must ignore it). |
|---|---|---|

Table 3 is a diagram showing an example LPIF specification addition to address dynamic clock gating in L0p, in accordance with various embodiments. In embodiments, L0p is defined as a substate of Active in LPIF. To allow aggressive dynamic clock gating by upper layers, an early valid indication in the receive path is defined—this is in addition to the clock gating mechanisms that already existed in LPIF 1.0 (referred to in Table 3).

TABLE 3

| | | |
|---|---|---|
| pl_early_valid | Per Port | This is an optional signal to enable more dynamic clock gating opportunities for the Link Layer when in Active.L0p state.<br>As the link width is narrower in L0p, the logPHY can take multiple clock cycles to accumulate a flit before transferring it to the link layer, and the number of flits being forwarded to a particular link layer could be sparsely spaced in time.<br>This signal must be kept asserted by logPHY when not in Active.L0p sub-state.<br>It is required to have a fixed clock cycle delay between the rising edge of pl_early_valid and the rising edge of pl_valid. The value of this delay is implementation specific and chosen at design compile time.<br>This signal is not applicable for CXL1.1 and CXL2.0 or when pl_protocol_flitmode = 0. (link layer must ignore it) |

With this dynamic clocking, an indication can be provided to a link layer to enable greater power savings. This is so, as in embodiments, LPIF data width does not change with dynamic link modulation, since the LPIF data width may be fixed on link subdivision. As such, it may take some number of cycles for a logPHY circuit to accumulate a flit's worth of data for communication to upper layers. For example, assume an original link width of ×16, where the LPIF data width is 64 bytes. If in a L0p substate, the link width is reduced to, e.g., an x1 width, the LPIF interface still communicates at 64 bytes, such that a number of cycles may occur to accumulate the 64 bytes. By way of this early valid signal, reduced power may be realized such that the upper layers can be active when the 64 bytes have been accumulated and are ready for communication.

Table 4 is a diagram showing an example LPIF specification addition to address performance tuning in the presence of a single flit retry, in accordance with various embodiments. Flit mode retry is in the logPHY. In cases where single flit retry is supported, logPHY can monitor that and request protocol layer to insert a given number of no operation (NOP) flits so as to prevent overflow of the Rx replay buffer on the remote link partner (refer to PCie spec for receive (Rx) replay buffer details).

TABLE 4

| | | |
|---|---|---|
| pl_nop_insert[2:0] | Per Port | This is an optional signal to enable performance hints to Link Layer when in flit mode. logPHY could be monitoring the replay frequency of single flit replays and give a hint to the upper layers to insert a stream of NOP flits that allow the remote link partner's Rx to catchup. When supported, link layer uses this hint to opportunistically insert the corresponding stream of NOP flits. NOP flit definition is protocol specific.<br>The encodings are as follows:<br>000: No hint, best latency<br>001: hint to insert at least 1 NOP flit<br>010: hint to insert at least 2 NOP flits<br>011: hint to insert at least 3 NOP flits<br>100: hint to insert at least 4 NOP flits<br>other encodings are reserved.<br>This signal is not applicable for CXL1.1 and CXL2.0 or when pl_protocol_flitmode = 0 (link layer must ignore it) or pl_state_status is not ACTIVE. |

Table 5 is a diagram showing an example LPIF specification addition to address direct signal for DLLP transfer from protocol layer to logical PHY, in accordance with various embodiments. Regarding DLLP transfer from protocol layer to logPHY, this is an optimization that allows logPHY to present the latest available DLLP to the remote link partner even in cases of flit retry. DLLP is transferred separate from the main datapath and logPHY packs it into the flit. In case of replay, it will use the latest available DLLP information to overwrite the DLLP bytes in the replayed flit (as long as the protocol allows it—for example pcie/cxl.io) and regenerate CRC/FEC. As such, the logPHY can insert the most recent DLLP information when a retry flit is to be sent, overriding the DLLP information that may have been present when the flit was originally sent. Although embodiments are not limited in this regard, such DLLP information may include credit information, data link layer initialization packets, feature exchange information, and power management related exchanges. In certain scenarios (for example L0p), the logPHY may generate its own DLLP packets as well in order to negotiate information with a remote link partner.

Table 5 shows signal descriptions.

TABLE 5

| | | |
|---|---|---|
| lp_dllp [NDLLP-1:0] | Shared[1] | Link Layer to logPHY DLLP bus that is used to transfer DLLP flits.<br>This signal is not applicable for CXL1.1 and CXL2.0 or when pl_protocol_flitmode = 0 (logPHY must ignore it). Definition of DLLP flits is protocol specific and protocols (for example CXL.cache/mem and UPI) are permitted to not use this signal. |
| lp_dllp_valid | Per Port | Indicates valid DLLP transfer on lp_dllp. DLLP transfers are not subject to backpressure by pl_trdy (the logPHY is expected to have storage for different types of DLLP and this can be overwritten so that the latest DLLPs are sent to remote link partner). DLLP transfers are subject to backpressure by pl_stallreq-link layer must stop DLLP transfers at DLLP flit aligned boundary before giving lp_stallack.<br>This signal is not supported for CXL1.1 and CXL2.0 or when pl_protocol_flitmode = 0. |

L0p enhancements: (a) embodiments may include a mechanism and/or signal for link layer to logPHY to indicate how many lanes are requested to be active when in L0p; (b) a mechanism/signal for logPHY to indicate to link layer the result of negotiation with the remote link partner and current status of number of active lanes when in L0p (in addition to port bifurcation and originally trained link width).

Embodiments include mechanisms/signals to indicate the negotiated protocol (PCie/CXL type 1 vs 2 vs 3/UPI), protocol version (e.g., CXL1.1/2.0/3.0), whether in flit mode or not, and which flit type to use. In addition, in embodiments for dynamic hotplug support for switching protocol and modes, the following rules are used: it is expected that pl_portmode and pl_portmode_vld are present before clock gating is enabled by firmware, or the sampling of pl_portmode and pl_portmode_vld is on a free running clock.

In an embodiment, rules for a link layer may include:
 1. May sample and store pl_protocol* when pl_protocol_vld=1 and pl_state_sts=RESET and pl_inband_pres=1. It may treat this saved value as the negotiated protocol until pl_state_sts=RESET and pl_inband_pres=0.
 2. Link layer is allowed to delay lp_exit_cg_ack and/or lp_state_req=ACTIVE until pl_protocol_vld is asserted, but both must assert within a reasonable time after lp_exit_cg_req=1 and pl_protocol_vld=1.

3. Link layer is permitted to clock gate itself when pl_state_sts=RESET and pl_inband_pres=0 (in which case it will not request for ACTIVE). When this is supported, if pl_inband_pres goes from 1 0 when pl_state_sts=RESET, the link layer may move pl_state_req from ACTIVE to NOP and go back to clock-gated state.

In an embodiment, rules for a logPHY circuit may include ensuring that if pl_inband_pres=1 and pl_protocol_vld=1 and pl_state_sts=RESET, then pl_protocol is the correct protocol for link layers to sample.

For data transfer in flit mode, data is transferred from link layer to the logPHY using fixed flit size and formats. Depending on the flit size and data width, it is possible that the entire flit is transferred on a single clock cycle, or it can take multiple clock cycles for a flit transfer. For example, if there is no link subdivision and the protocol is CXL 1.1 (flit size of 64 B+2 B CRC from CXL.$mem link layer), it is possible for the entire flit to be transferred in 1 cycle across a 64 B data bus (the CRC bytes going on lp_crc). Or it could take multiple cycles for narrower data widths. In all cases the rules around lp_irdy and pl_trdy must be followed on Tx. If a flit transfer takes multiple cycles, it is required that link layer does not deassert lp_irdy or lp_valid in the middle of a flit transfer (even if pl_trdy deasserts)—i.e. no bubbles are allowed in the middle of a flit.

On the Rx path, it is permitted for logPHY to insert bubbles in the middle of a flit transfer. For Rx, the logPHY will forward the flit received from the link as is (after any error correction), and it is the responsibility of the link layer to pull out the relevant information (for example, in PCie the link layer will have to pull out the DLLP bytes from the flit and process them separately). For some protocols like CXL and UPI, when applicable, logPHY is permitted to drop NOP flits on Rx.

Protocols can define flit formats such that there are reserved bits in the flit that will only be populated by logPHY (as in the case of PCie 6.0 or CXL 3.0 or UPI 3.0). In this case, the link layer drives a logic zero in those bit positions within the flit on Tx. Flit formats may be defined by the protocols, but added in LPIF to indicate which bits are driven by the link layer versus the physical layer. This is in contrast, to conventional implementations, in which a link layer typically sends fixed byte widths of information, e.g., 64 bytes.

Figure 5:
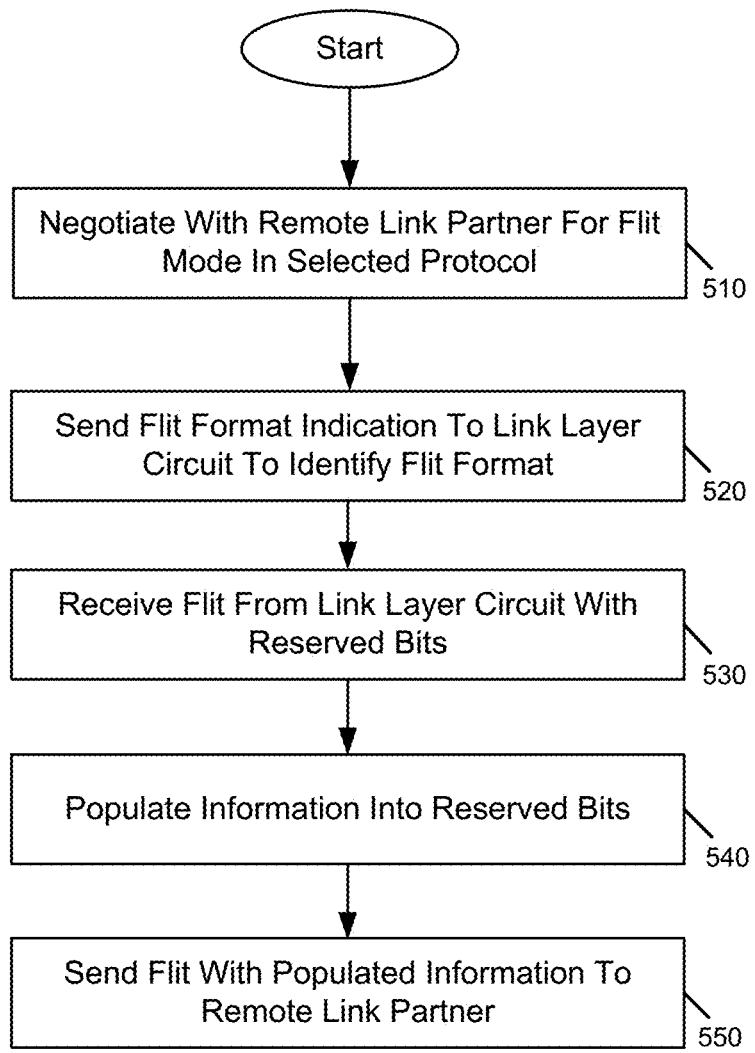
FIG. 5 is a flow diagram of a method in accordance with another embodiment.

Referring now to FIG. 5, shown is a flow diagram of a method in accordance with another embodiment. As shown in FIG. 5, method 500 may be implemented within a logPHY circuit such as in a flit format circuit to insert, at the logPHY circuit, certain information into flit information received from upper layers. As such, method 500 may be performed by circuitry within the logPHY circuit such as formatting circuitry as described herein. More generally, embodiments may be implemented using hardware circuitry, firmware, software and/or combinations thereof.

As described above, certain portions of a flit can be reserved, such that the upper layers do not populate these reserved portions (e.g. instead filling with logic 0 values) such that the logPHY circuit can insert certain information, such as metadata regarding the flit or so forth. As such, hardware can be simplified as there is no need for complex multiplexing, shifting, carrying or other operations that would be needed in performing CRCs or other computations, as these reserved bits are known to be zeroes.

As shown in FIG. 5, method 500 begins at block 510 by negotiating with a remote link partner for a flit mode within a selected communication protocol. Next at block 520 the logPHY circuit may send a flit format indication to a link layer circuit to identify that the operation is to be in flit mode. As such, at this point various components are configured accordingly to enable communications to occur in flit mode with a given flit format.

As further illustrated, during such flit mode of operation, at block 530 the logPHY circuit may receive a flit from the link layer circuit with at least certain bits, e.g., one or more fields within a flit, reserved. These reserved bits may be used for insertion of information within the logPHY circuit. Thus at block 540 certain information may be populated into these reserved bits, which may be implemented as one or more fields, each of one or more byte widths. As one example, the information to be populated by the logPHY circuit may be information from a most updated DLLP received within the logPHY circuit from the link layer circuit, and may include information defined by the protocol. For example, in a PCie implementation, this information may include sequence number, acknowledgements, NAKs, error correction and detection information, status information and so forth.

Still with reference to FIG. 5, finally at block 550 the logPHY circuit may send this flit with the populated information to the remote link partner. Understand while shown at this high level in the embodiment of FIG. 5, many variations and alternatives are possible.

Figure 6A:
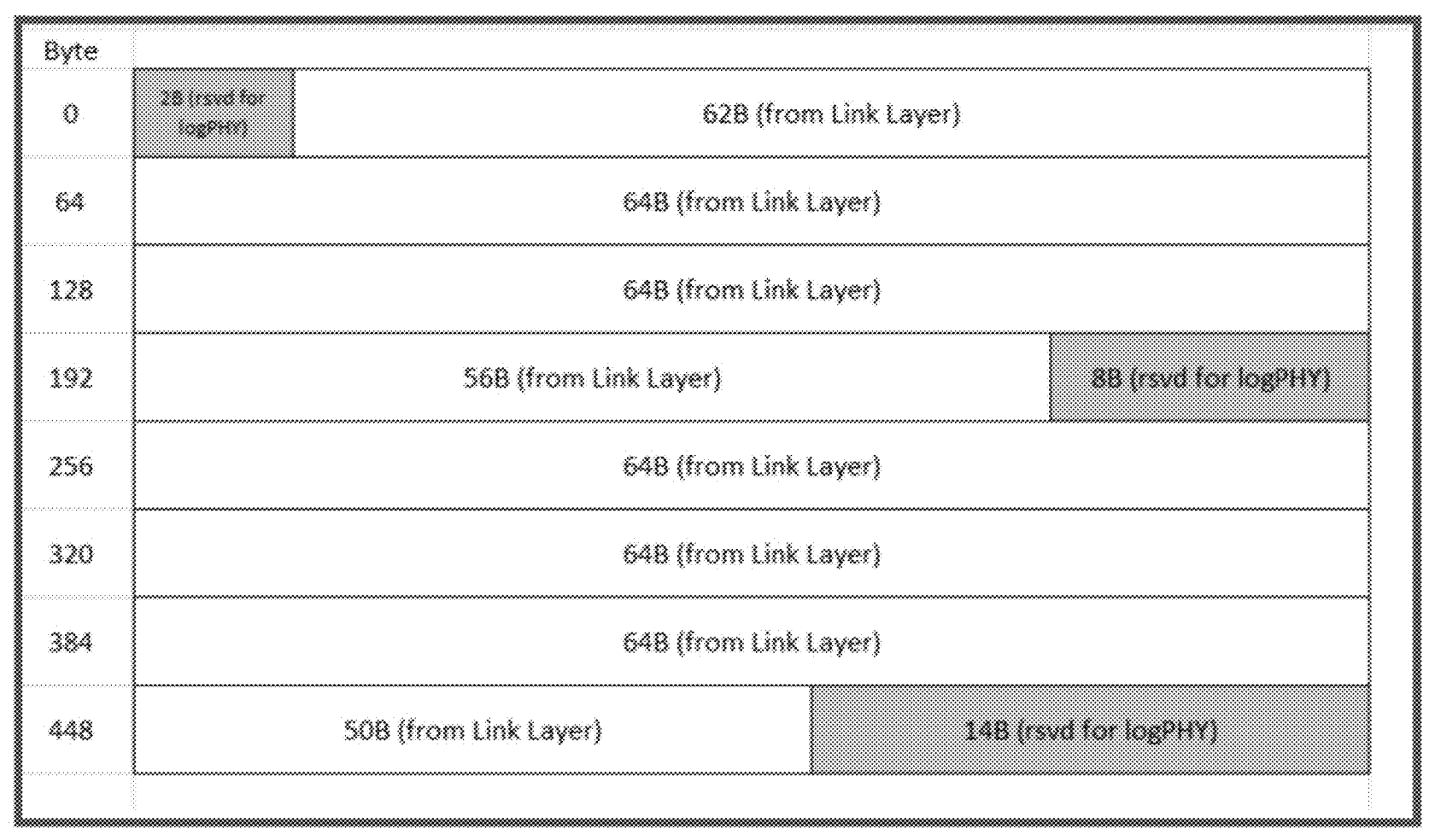

FIG. 6A is a diagram showing an example flit format, in accordance with various embodiments. Flit formats are defined by the protocols, but added in LPIF to indicate which bits are driven by link layer vs physical layer. For example, the UPI flit format given in FIG. 6A corresponds to pl_protocol_flitfmt=2'b00. FIG. 6B is a diagram showing another example UPI flit format in FIG. 6B corresponding to pl_protocol_flitfmt=2'b01.

Figure 6C:
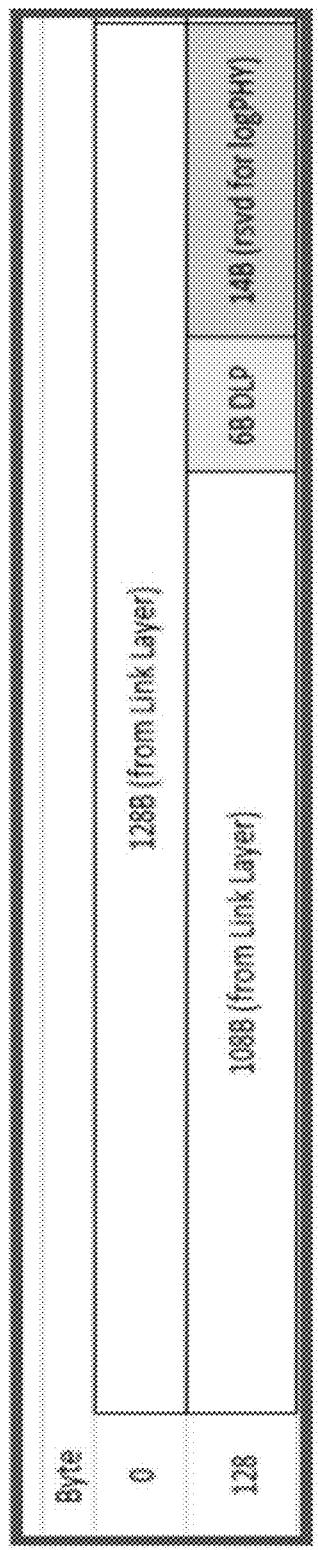

Other example applications of flit mode can be for other protocols, including formats for PCIe 6.0. PCIe 6.0 Express Base Specification, Revision 6.0 defines detailed flit formats. A single flit format is supported, corresponding to pl_protocol_flitfmt=2'b00. The lp_dllp field is used for this protocol. The definition of the DLLP flits is the same as the 32 bit flit mode format defined in the Data Link Layer chapter of the PCI Express Base Specification, Revision 6.0. FIG. 6C shows the flit format spread over a data width of 128 B. The bytes marked DLP follow the definition given in PCI Express Base Specification, Revision 6.0 and are reserved for logPHY with one exception; whenever a flit needs to carry the flit status field, the link layer sets the Type of DLLP Payload and Flit Marker bits to 1'b1 and drives the appropriate flit status on the Flit Status bits. If a flit does not carry the flit status field, link layer drives 0 on the Type of DLLP Payload and Flit Marker bits and the Flit Status field. The bit positions of these fields are defined in PCI Express Base Specification, Revision 6.0.

Figure 6D:
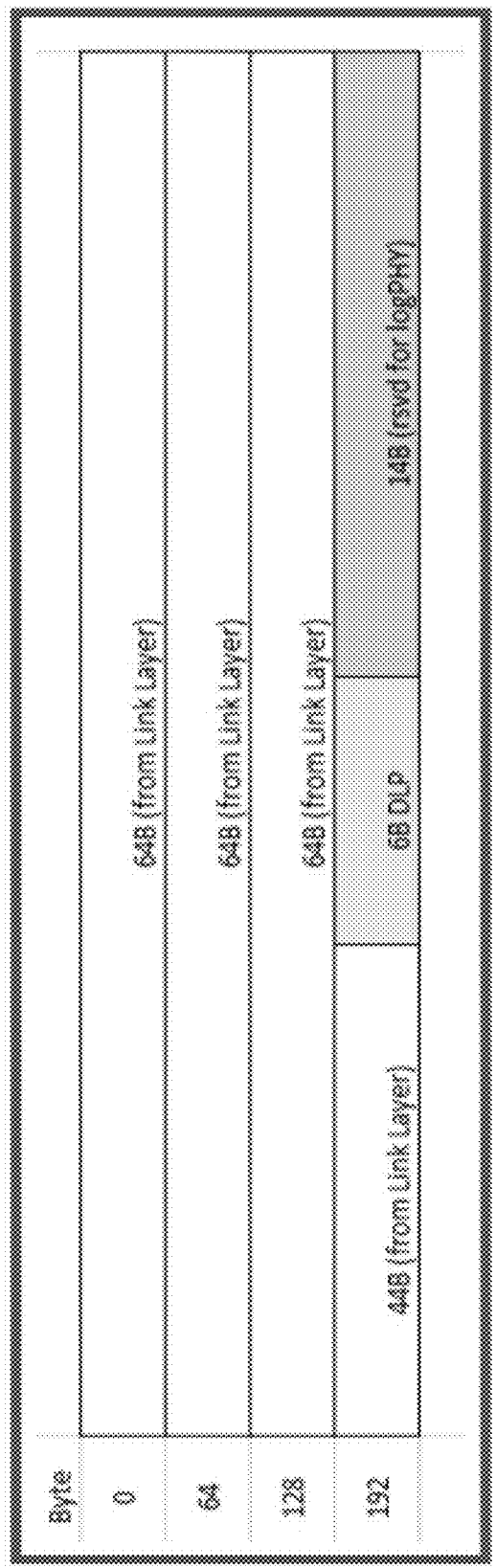

FIG. 6D shows the flit format spread over a data width of 64 B. As can be seen in the format, it takes four chunk transfers (lp_irdy=1, lp_valid=1, pl_trdy=1 at a rising clock edge) to complete a flit transfer and the link layer is expected to drive 0 on the bits reserved for logPHY.

For CXL 1.1 and CXL 2.0, there is only one type of flit corresponding to pl_protocol_flitfmt=2'b00. All of the flit is populated by the link layer and transmitted across LPIF.

For CXL 3.0, the flit formats are as shown in FIGS. 6E and 6F, assuming a 64 B wide data path. For both formats CXL.IO link layer uses the lp_dllp signal.

Embodiments may include an addition of Retrain to Reset state transition to allow for link training and status state machine (LTSSM) timeouts to have a natural mapping to LPIF state.

Embodiments include support of Downstream Port Containment, error isolation/warm reset and Sx flows with example illustrations of the signal transitions. In embodiments, Sx flows may be platform level power management flows. In embodiments, LPIF may illustrate examples of how a system on a chip (SoC) and an Interconnect stack can handshake to make sure the physical links are in the appropriate power management state (for example L2 in the case of PCIe).

Figure 7:
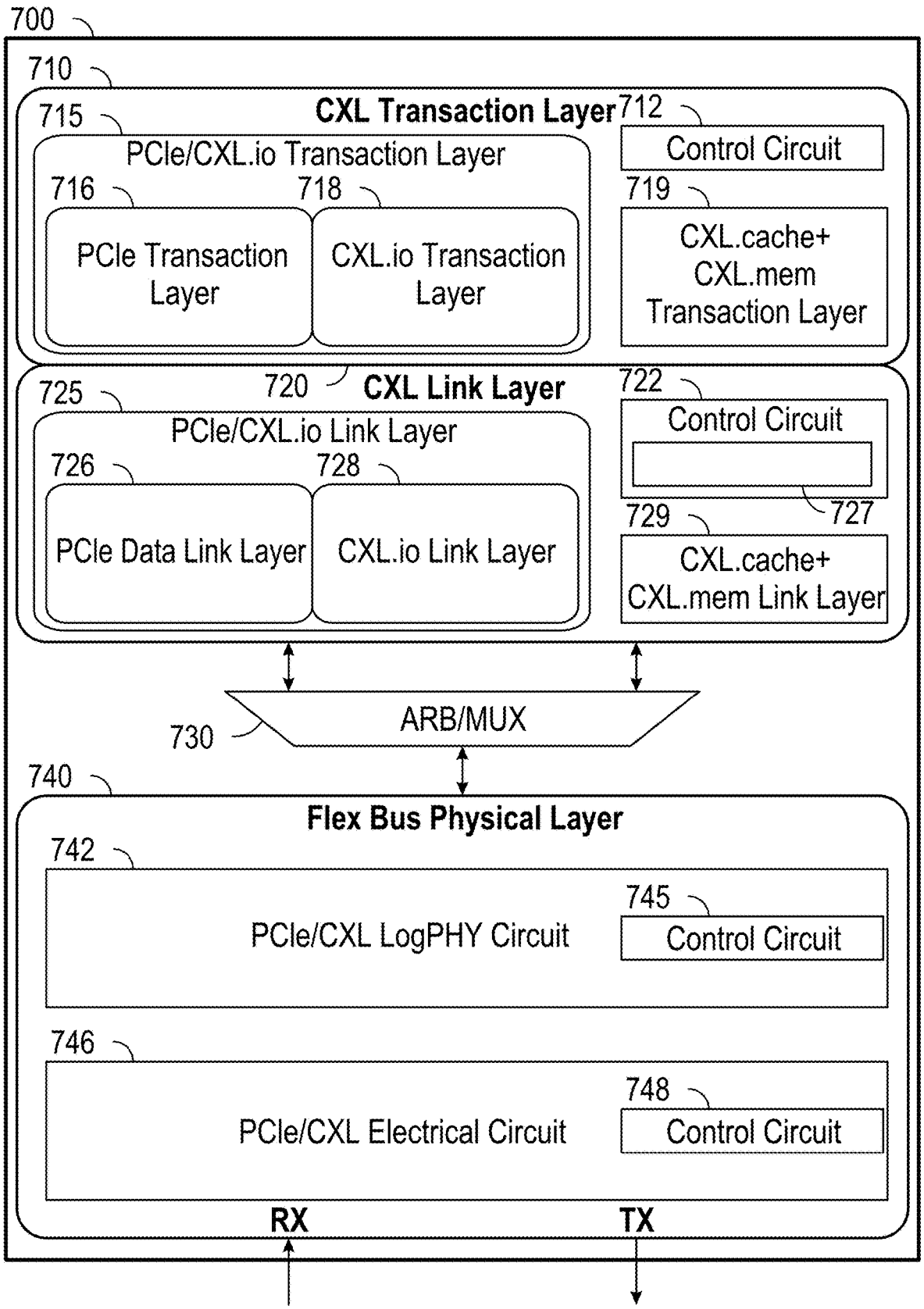
FIG. 7 is a block diagram of an interface circuit in accordance with an embodiment.

Referring now to FIG. 7, shown is a block diagram of an interface circuit in accordance with an embodiment. More specifically as shown in FIG. 7, interface circuit 700 is for interfacing a given device such as a transmitter and/or receiver to a link. In the embodiment shown in FIG. 7, interface circuit 700 is a CXL interface circuit. As shown, CXL interface circuit 700 includes a transaction layer 710, a link layer 720, and a physical layer 740. With reference to CXL transaction layer 710, various components are included to enable transaction layer processing for PCIe/CXL.io communications and CXL.cache and CXL.memory transactions. More particularly, a PCIe/CXL.io transaction layer 1015 includes a control circuit 712, which may perform various transaction layer control operations. In addition, transaction layer 710 further includes a PCIe transaction layer 716 and additional circuitry 718 for handling enhancements to PCIe transaction layer 716 for handling CXL.io transactions. In turn, CXL.cache and CXL.memory transaction layer 719 may perform transaction layer processing for these protocols.

With reference to CXL link layer 720, various components are included to enable link layer processing for PCIe/CXL.io communications and CXL.cache and CXL.memory transactions. More particularly, a PCIe/CXL.io link layer 725 includes a PCIe data link layer 726 and additional circuitry 728 for handling enhancements to PCIe data link layer 726 for handling CXL.io transactions.

In turn, CXL.cache and CXL.memory link layer 729 may perform link layer processing for these protocols, including handling information in a selected one of a flit or non-flit mode. To this end, a control circuit 722 may configure handling circuitry within link layer 729 based at least in part on communications with a logPHY circuit as described herein. In an embodiment, control circuit 722 may include or be coupled to one or more configuration registers 727. Such configuration registers may include one or more fields to control such handling circuitry, e.g., to send information with given flit formats and reserved bytes as described herein.

With further reference to FIG. 7, link layer 720 is coupled to an arbiter/multiplexer 730 that is to receive incoming data streams from link layer 720 and select a data stream (or portion thereof) for communication to a physical layer 740.

In an embodiment, physical layer 740 may be a physical layer to further process incoming data packets for communication on a physical link, which in an embodiment may be a flex bus. As illustrated, physical layer 740 includes a PCIe/CXL logPHY logical circuit 742 and a PCIe/CXL electrical circuit 746. As seen, these circuits include respective control circuits 745, 748 to control processing within physical layer 740. After all such processing is completed, outgoing transaction layer data packets may be communicated on the link. Similarly, incoming transaction layer data packets may be received within physical layer 740 and processed within the communication stack of interface circuit 700. Understand while shown at this high level in the embodiment of FIG. 7, many variations and alternatives are possible.

Figure 8:
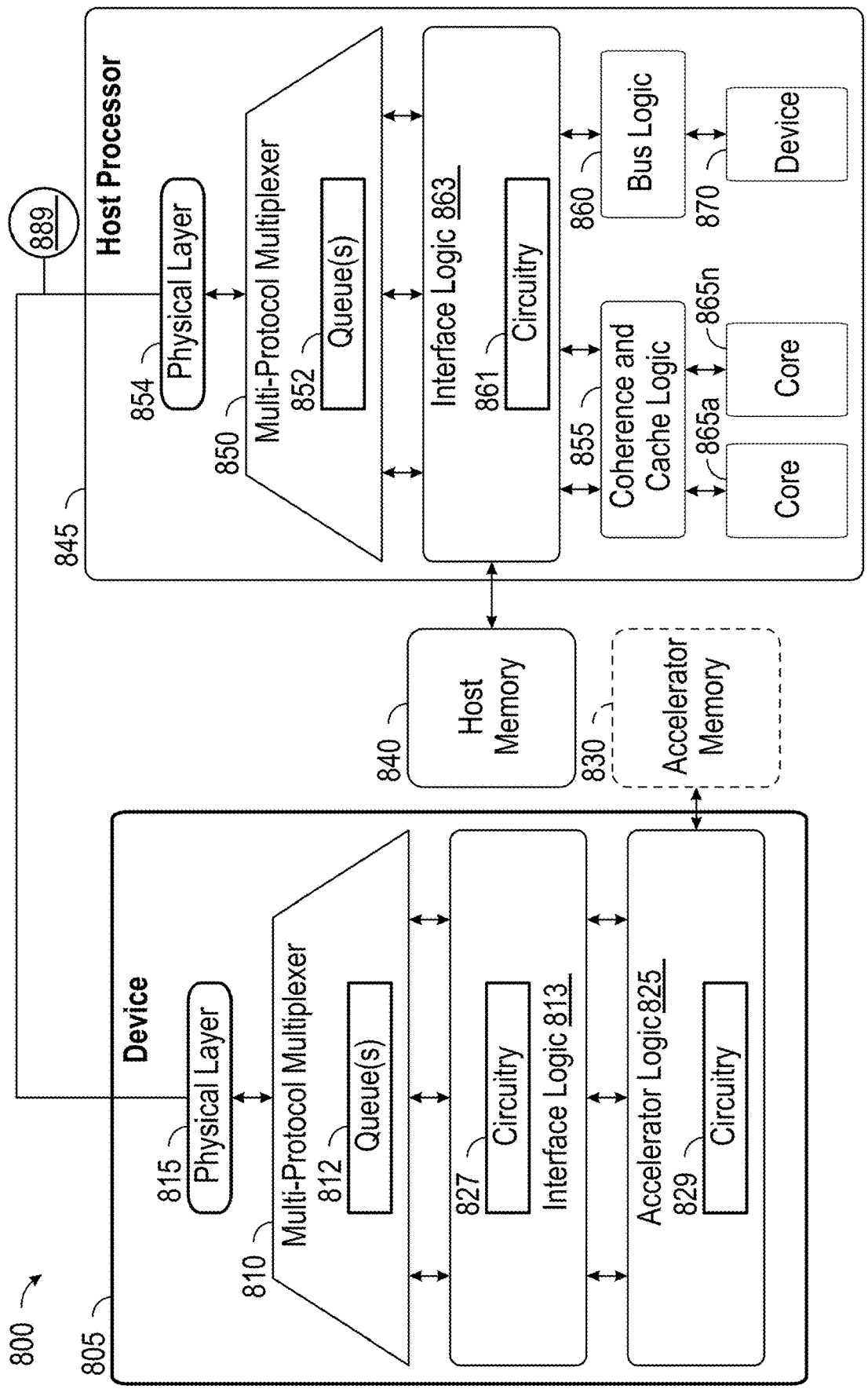
FIG. 8 is a block diagram of a system in accordance with an embodiment.

FIG. 8 is a block diagram of a system in accordance with an embodiment. As shown in FIG. 8 a device 805 may be an accelerator or processor device coupled to a host processor 845 via an interconnect 889, which may be single interconnect, bus, trace, and so forth. Device 805 and host processor 845 may communicate over link 889 to enable data and messages to pass therebetween. In some embodiments, link 889 may be operable to support multiple protocols and communication of data and messages via the multiple interconnect protocols, including a CXL protocol as described herein. For example, link 889 may support various interconnect protocols, including a non-coherent interconnect protocol, a coherent interconnect protocol, and a memory interconnect protocol. Non-limiting examples of supported interconnect protocols may include PCI, PCIe, USB, IDI, IOSF, SMI, SMI3, SATA, CXL.io, CXL.cache, and CXL.mem, and/or the like.

In embodiments, device 805 may include accelerator logic 825 including circuitry 829. In some instances, accelerator logic 825 and circuitry 829 may provide processing and memory capabilities. Examples of device 805 may include producer-consumer devices such as a graphics or other specialized accelerator, producer-consumer plus devices, software-assisted device memory devices, autonomous device memory devices, and giant cache devices. In some cases, accelerator logic 825 may couple to an optional accelerator memory 830. Accelerator logic 825 and circuitry 829 may provide the processing and memory capabilities based on the device. For example, accelerator logic 825 and circuitry 829 may communicate using, for example, a coherent interconnect protocol for various functions, such as coherent requests and memory flows with host processor 845 via interface logic 813 and circuitry 827.

Interface logic 813 and circuitry 827 may determine an interconnect protocol based on the messages and data for communication. Understand that with embodiments herein, circuitry 827 may include circuitry to handle protocol enhancements, including control of flit and non-flit modes as described herein. In some embodiments, interface logic 813 may be coupled to a multi-protocol multiplexer 810 having one or more protocol queues 812 to send and receive messages and data with host processor 845. Protocol queue 812 may be protocol specific such that each interconnect protocol may be associated with a particular protocol queue. Multiplexer 810 may also implement arbitration circuitry to arbitrate between communications of different protocols and provide selected communications to a physical layer 815.

In various embodiments, host processor 845 may be a main processor such as a CPU. Host processor 845 may be coupled to a host memory 840 and may include coherence logic (or coherence and cache logic) 855, which may include a cache hierarchy. Coherence logic 855 may communicate using various interconnects with interface logic 863 including circuitry 861 and one or more cores 865a-n. In some embodiments, coherence logic 855 may enable communication via one or more of a coherent interconnect protocol and a memory interconnect protocol.

In various embodiments, host processor 840 may include a device 870 to communicate with a bus logic 860 over an interconnect. In some embodiments, device 870 may be an I/O device, such as a PCIe I/O device. In other cases, one or more external devices such as PCIe devices may couple to bus logic 870.

In embodiments, host processor 845 may include interface logic 863 and circuitry 861 to enable multi-protocol communication between the components of host processor 845 and device 805. Interface logic 863 and circuitry 861 may process and enable communication of messages and data between host processor 845 and device 805 in accordance with one or more interconnect protocols, e.g., a non-coherent interconnect protocol, a coherent interconnect, protocol, and a memory interconnect protocol, dynamically. For example, interface logic 863 and circuitry 861 may determine a message type for each message and determine which interconnect protocol of a plurality of interconnect protocols to process each of the messages. Different interconnect protocols may be utilized to process the messages. In addition, circuitry 1161 may include selection circuitry to direct, e.g., CXL.cache and CXL.memory protocol traffic via a selected one of multiple logical ports as described herein.

In some embodiments, interface logic 863 may be coupled to a multi-protocol multiplexer 850 having one or more protocol queues 852 to send and receive messages and data with device 805. Protocol queue 852 may be protocol specific such that each interconnect protocol may be associated with a particular protocol queue. Multiplexer 850 may also implement arbitration circuitry to arbitrate between communications of different protocols and provide selected communications to a physical layer 854.

Figure 9:
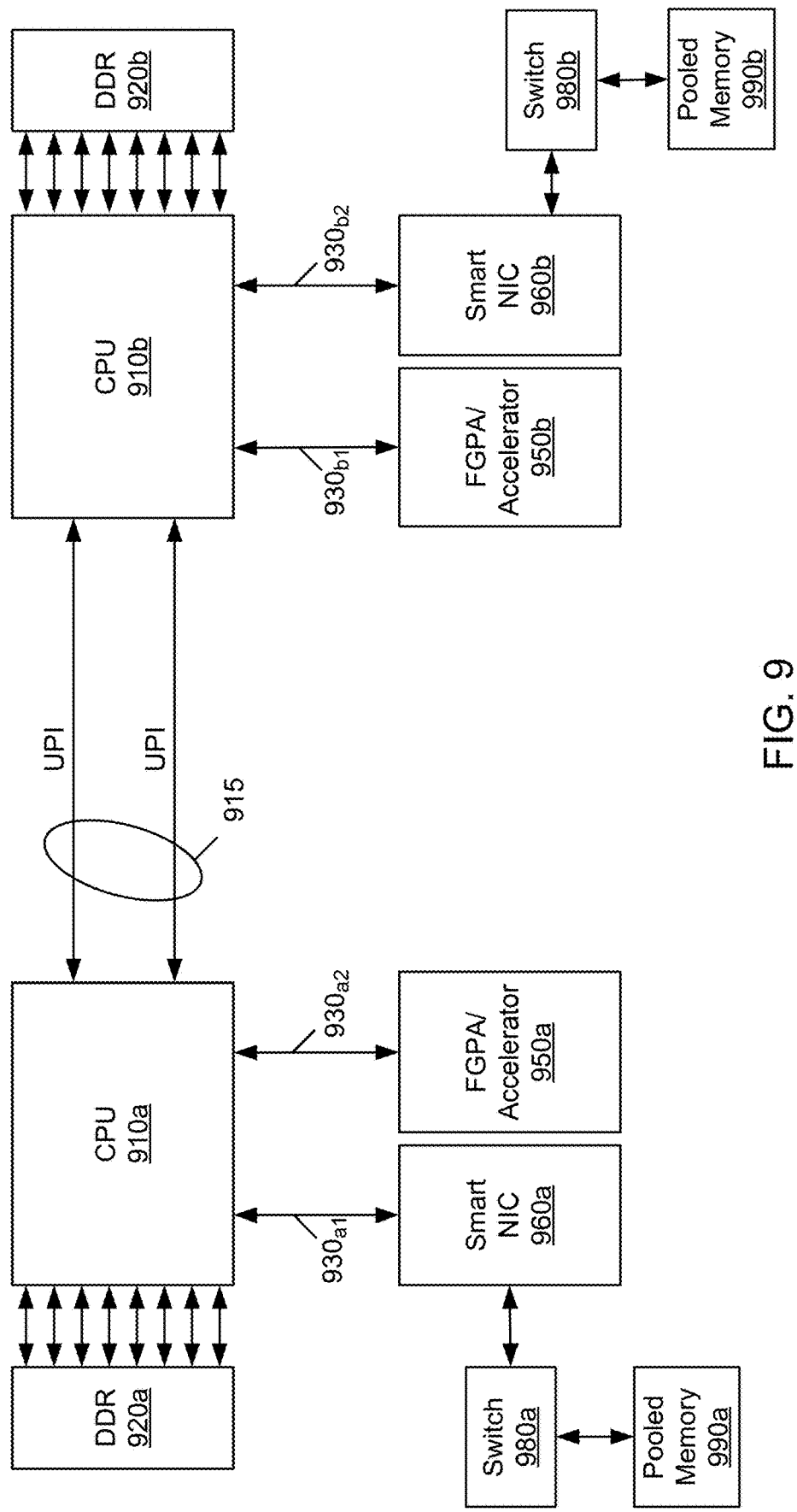
FIG. 9 is a block diagram of a system in accordance with another embodiment of the present invention.

Referring now to FIG. 9, shown is a block diagram of a system in accordance with another embodiment of the present invention. As shown in FIG. 9, a system 900 may be any type of computing device, and in one embodiment may be a server system such as an edge platform. In the embodiment of FIG. 9, system 900 includes multiple CPUs 910*a,b* that in turn couple to respective system memories 920*a,b* which in embodiments may be implemented as double data rate (DDR) memory. Note that CPUs 910 may couple together via an interconnect system 915 such as an Intel® Ultra Path Interconnect or other processor interconnect technology.

To enable coherent accelerator devices and/or smart adapter devices to couple to CPUs 910 by way of potentially multiple communication protocols, a plurality of interconnects 930*a1-b2* may be present. In an embodiment, each interconnect 930 may be a given instance of a CXL link.

In the embodiment shown, respective CPUs 910 couple to corresponding field programmable gate arrays (FPGAs)/accelerator devices 950*a,b* (which may include graphics processing units (GPUs), in one embodiment. In addition CPUs 910 also couple to smart network interface circuit (NIC) devices 960*a,b*. In turn, smart NIC devices 960*a,b* couple to switches 980*a,b* (e.g., CXL switches in accordance with an embodiment) that in turn couple to a pooled memory 990*a,b* such as a persistent memory. With an arrangement as in FIG. 9, CPUs 910 may direct information of multiple communication protocols (e.g., CXL.cache and CXL.memory protocol traffic) via a selected one of flit or non-flit modes as described herein to devices 950. As shown information can be stored in a pooled memory 990. In turn, CPUs 910 or other entities may access and further process this information from pooled memory 990.

Figure 10:
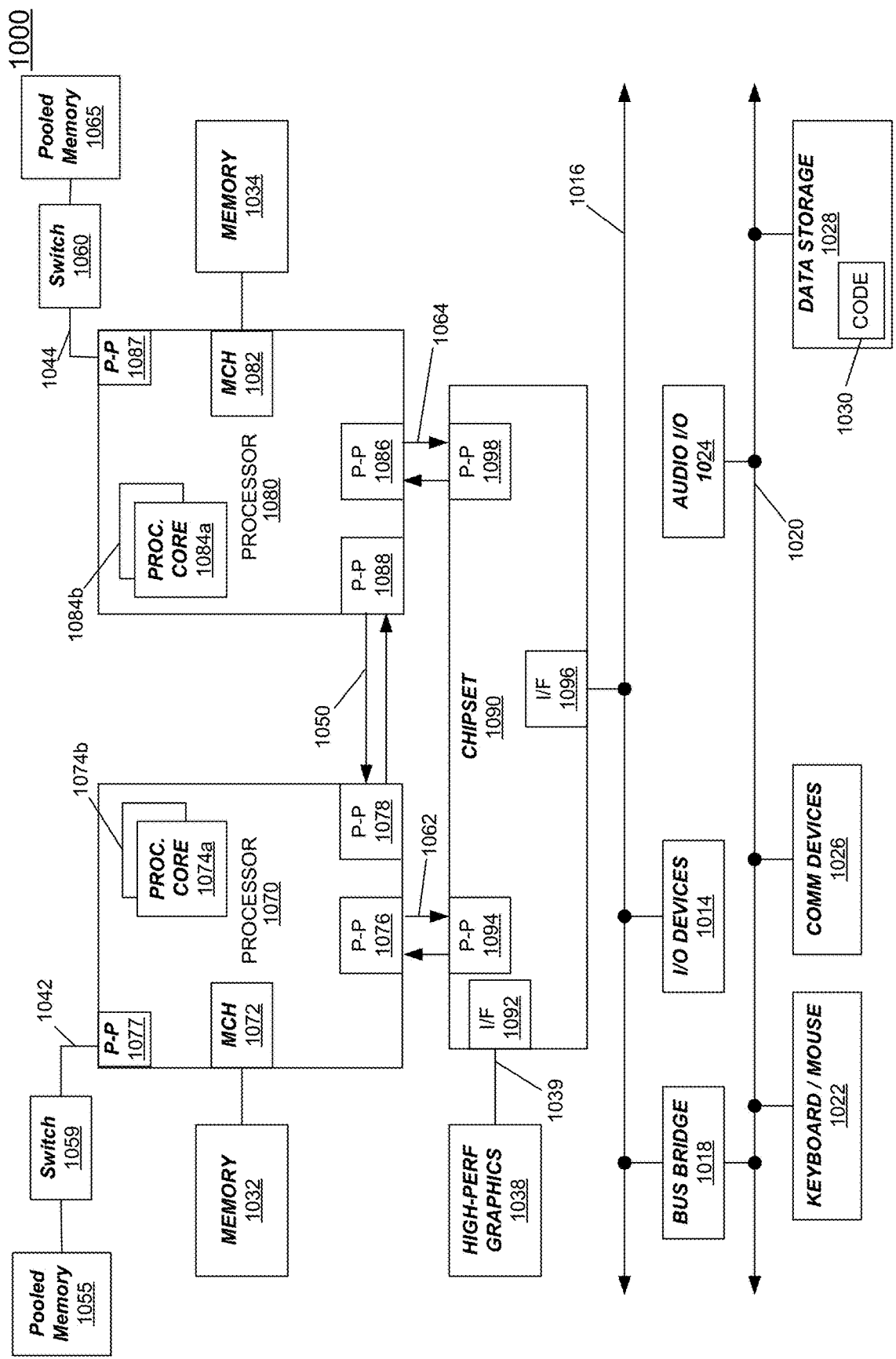
FIG. 10 is a block diagram of a system in accordance with another embodiment of the present invention.

Referring now to FIG. 10, shown is a block diagram of a system in accordance with another embodiment such as an edge platform. As shown in FIG. 10, multiprocessor system 1000 includes a first processor 1070 and a second processor 1080 coupled via a point-to-point interconnect 1050. As shown in FIG. 10, each of processors 1070 and 1080 may be many core processors including representative first and second processor cores (i.e., processor cores 1074*a* and 1074*b* and processor cores 1084*a* and 1084*b*). In the embodiment of FIG. 10, processors 1070 and 1080 further include point-to point interconnects 1077 and 1087, which couple via interconnects 1042 and 1044 (which may be CXL buses) to switches 1059 and 1060. Such traffic may be according to multiple protocols, including CXL.cache and CXL.memory protocol traffic via a selected one of flit or non-flit modes as described herein. In turn, switches 1059, 1060 couple to pooled memories 1055 and 1065.

Still referring to FIG. 10, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 10, MCH's 1072 and 1082 couple the processors to respective memories, namely a memory 1032 and a memory 1034, which may be portions of system memory (e.g., DRAM) locally attached to the respective processors. First processor 1070 and second processor 1080 may be coupled to a chipset 1090 via P-P interconnects 1076 and 1086, respectively. As shown in FIG. 10, chipset 1090 includes P-P interfaces 1094 and 1098.

Furthermore, chipset 1090 includes an interface 1092 to couple chipset 1090 with a high performance graphics engine 1038, by a P-P interconnect 1039. As shown in FIG. 10, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a disk drive or other mass storage device which may include code 1030, in one embodiment. Further, an audio I/O 824 may be coupled to second bus 1020.

Figure 11:
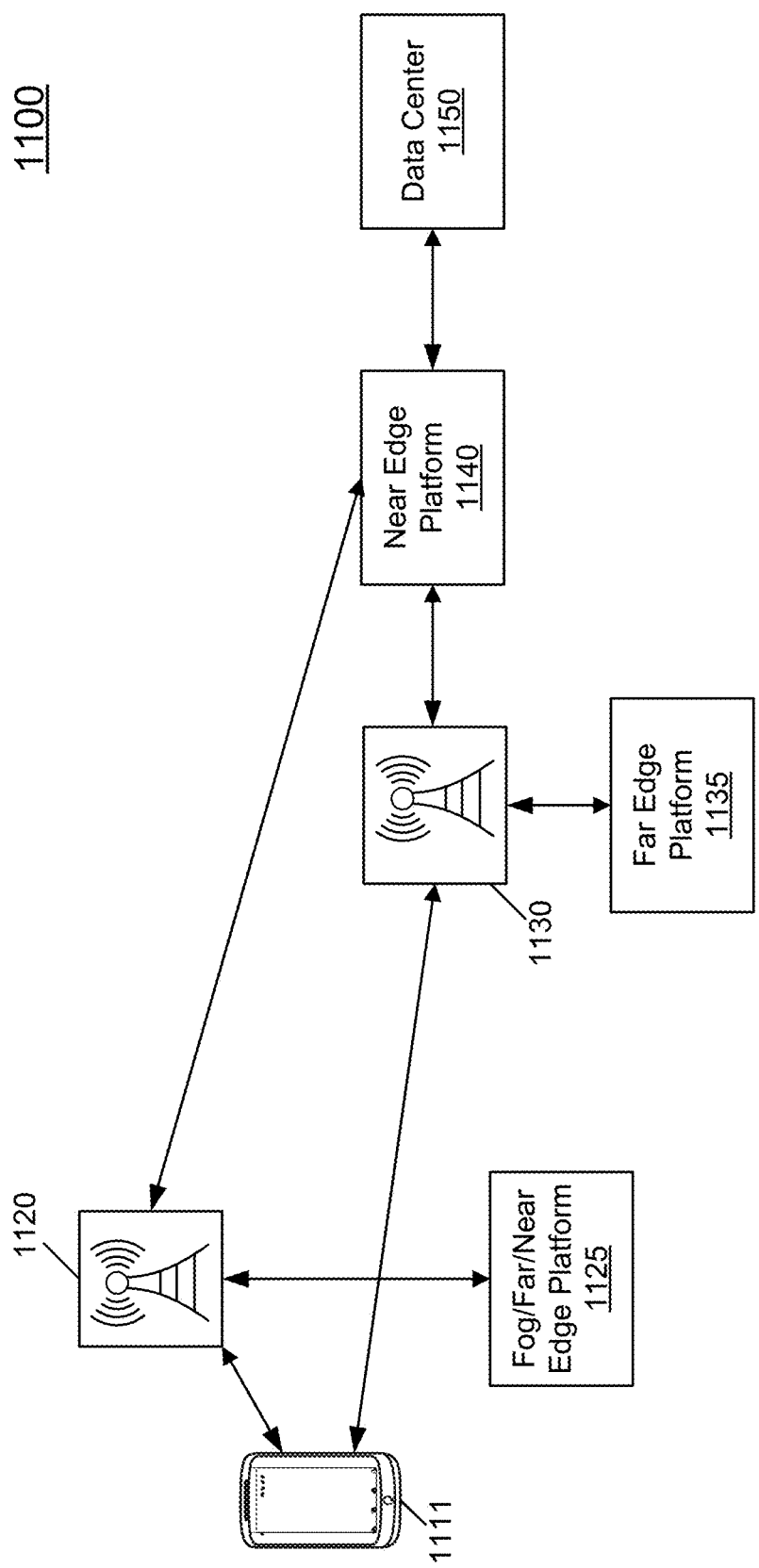
FIG. 11 is a block diagram of a network architecture in accordance with an embodiment.

Embodiments as described herein can be used in a wide variety of network architectures. To this end, many different types of computing platforms in a networked architecture that couples between a given edge device and a datacenter can communicate in the flit or non-flit modes described herein. Referring now to FIG. 11, shown is a block diagram of a network architecture in accordance with another embodiment of the present invention. As shown in FIG. 11, network architecture 1100 includes various computing platforms that may be located in a very wide area, and which have different latencies in communicating with different devices.

In the high level view of FIG. 11, network architecture 1100 includes a representative device 1111, such as a smartphone. This device may communicate via different radio access networks (RANs), including a RAN 1120 and a RAN 1130. RAN 1120 in turn may couple to a platform 1125, which may be an edge platform such as a fog/far/near edge platform, and which may leverage embodiments herein. Other requests may be handled by a far edge platform 1135 coupled to RAN 1130, which also may leverage embodiments.

As further illustrated in FIG. 11, another near edge platform 1140 may couple to RANs 1120, 1130. Note that this near edge platform may be located closer to a data center 1150, which may have a large amount of computing resources. By pushing messages to these more remote platforms, greater latency is incurred in handling requests on behalf of edge device 1111. Understand that all platforms shown in FIG. 11 may incorporate embodiments as described herein to communicate, e.g., PCIe, CXL.cache and CXL.memory protocol traffic in flit and/or non-flit modes as described herein.

The following examples pertain to further embodiments.

In one example, an apparatus comprises: a first link layer circuit to perform link layer functionality for a first communication protocol; a second link layer circuit to perform link layer functionality for a second communication protocol; and a selection circuit coupled to the first link layer circuit via a first LPIF link and coupled to the second link layer circuit via a second LPIF link, to provide first information from the first link layer circuit to a logPHY circuit and second information from the second link layer circuit to the logPHY circuit. The apparatus may further include the logPHY circuit coupled to the selection circuit via a third LPIF link, where the logPHY circuit is to communicate with the first link layer circuit in a flit mode in which the first information is communicated in a fixed width size and communicate with the second link layer circuit in a non-flit mode in which the second information is communicated in a variable width size.

In an example, the logPHY circuit is to communicate a flit mode signal to the first link layer circuit to cause the first link layer circuit to communicate the first information in the flit mode.

In an example, the apparatus further comprises a MAC circuit comprising the logPHY circuit to communicate with the first link layer circuit in the flit mode and to communicate with the second link layer circuit in the non-flit mode.

In an example, the logPHY circuit is to receive a first indication from the first link layer circuit that a first flit is a NOP flit, where in response to the first indication, the logPHY circuit is to not store the NOP flit in a replay buffer.

In an example, the first link layer circuit is to start a flit header in a middle of a flit and send the flit with the flit header to the logPHY circuit.

In an example, the logPHY circuit comprises an error detection circuit, and in response to detection of an error in an incoming flit, the logPHY circuit is to send a cancellation message to the first link layer circuit to cause the first link layer circuit to drop the incoming flit.

In an example, the logPHY circuit is to send the cancellation message within a predetermined number of clock cycles after the logPHY circuit sent the incoming flit to the first link layer circuit.

In an example, the logPHY circuit further comprises an error correction circuit to correct the error in the incoming flit, the logPHY circuit to send the corrected incoming flit to the first link layer circuit.

In an example, when a link is in a partial width mode, the logPHY circuit is to send an early valid indication to the first link layer circuit to enable the first link layer circuit to power up ahead of receipt of a flit from the logPHY circuit.

In an example, the logPHY circuit is to receive a retry request from a remote link partner for a first flit, and in response to the retry request, to send an indication to the first link layer circuit to cause the first link layer circuit to send one or more NOP flits to the logPHY circuit.

In an example, apparatus further comprises a sideband interface coupled between the first link layer circuit and the logPHY circuit to send DLLP information, where the logPHY circuit is to insert at least a portion of the DLLP information into a replay flit and send the replay flit with the at least portion of the DLLP information to a remote link partner.

In another example, a method comprises: receiving, in a logPHY circuit, a flit; sending the flit to a link layer circuit coupled to the logPHY circuit; detecting, in the logPHY circuit, an error in the flit; and sending a flit cancel signal to the link layer circuit to cause the link layer circuit to drop the flit.

In an example, the method further comprises: correcting, in the logPHY circuit, the error in the flit; and sending the corrected flit to the link layer circuit.

In an example, the method further comprises in response to a determination that the error cannot be corrected, sending a retry request to a remote link partner to re-send the flit.

In an example, the method further comprises sending the flit to the link layer circuit in parallel with checking the flit for the error.

In an example, the method further comprises sending the flit cancel signal within a predetermined number of cycles following sending the flit to the link layer circuit.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system comprises a first integrated circuit comprising: a MAC circuit to identify a flit format and send a flit format indication to a link layer circuit; and the link layer circuit coupled to the MAC circuit, where the link layer circuit is to perform link layer functionality on incoming information and format the incoming information into the flit format, where in response to the flit format indication, the link layer circuit is to send a flit to the MAC circuit having at least one reserved byte to be populated by the MAC circuit. The system further includes a remote link partner coupled to the first integrated circuit via a link.

In an example, the MAC circuit is to populate second information into the at least one reserved byte.

In an example, the MAC circuit is to populate the second information comprising data link layer information including one or more of error detection information and error correction information.

In an example, the MAC circuit is to send the flit format indication to the link layer circuit in response to a negotiation with the remote link partner for a flit mode of a negotiated communication protocol, the negotiated communication protocol further having a non-flit mode.

Understand that various combinations of the above examples are possible.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description.

The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first link layer circuit to perform link layer functionality for a first communication protocol;
a second link layer circuit to perform link layer functionality for a second communication protocol;
a selection circuit coupled to the first link layer circuit via a first logical PHY interface (LPIF) link and coupled to the second link layer circuit via a second LPIF link, to provide first information from the first link layer circuit to a logical physical (logPHY) circuit and second information from the second link layer circuit to the logPHY circuit; and
the logPHY circuit coupled to the selection circuit via a third LPIF link, wherein the logPHY circuit is to communicate with the first link layer circuit in a flit mode in which the first information is communicated in a fixed width size and communicate with the second link layer circuit in a non-flit mode in which the second information is communicated in a variable width size, wherein the first link layer circuit is to start a flit header in a middle of a flit and send the flit with the flit header to the logPHY circuit.

2. The apparatus of claim 1, wherein the logPHY circuit is to communicate a flit mode signal to the first link layer circuit to cause the first link layer circuit to communicate the first information in the flit mode.

3. The apparatus of claim 1, further comprising a media access control (MAC) circuit comprising the logPHY circuit to communicate with the first link layer circuit in the flit mode and to communicate with the second link layer circuit in the non-flit mode.

4. The apparatus of claim 1, wherein the logPHY circuit is to receive a first indication from the first link layer circuit that a first flit is a no operation (NOP) flit, wherein in response to the first indication, the logPHY circuit is to not store the NOP flit in a replay buffer.

5. The apparatus of claim 1, wherein the logPHY circuit comprises an error detection circuit, and wherein in response to detection of an error in an incoming flit, the logPHY circuit is to send a cancellation message to the first link layer circuit to cause the first link layer circuit to drop the incoming flit.

6. The apparatus of claim 5, wherein the logPHY circuit is to send the cancellation message within a predetermined number of clock cycles after the logPHY circuit sent the incoming flit to the first link layer circuit.

7. The apparatus of claim 5, wherein the logPHY circuit further comprises an error correction circuit to correct the error in the incoming flit, the logPHY circuit to send the corrected incoming flit to the first link layer circuit.

8. The apparatus of claim 1, wherein when a link is in a partial width mode, the logPHY circuit is to send an early valid indication to the first link layer circuit to enable the first link layer circuit to power up ahead of receipt of a first flit from the logPHY circuit.

9. The apparatus of claim 1, wherein the logPHY circuit is to receive a retry request from a remote link partner for a first flit, and in response to the retry request, to send an indication to the first link layer circuit to cause the first link layer circuit to send one or more no operation (NOP) flits to the logPHY circuit.

10. The apparatus of claim 1, further comprising a sideband interface coupled between the first link layer circuit and the logPHY circuit to send data link layer packet (DLLP) information, wherein the logPHY circuit is to insert at least a portion of the DLLP information into a replay flit and send the replay flit with the at least portion of the DLLP information to a remote link partner.

11. At least one non-transitory computer readable storage medium having stored thereon instructions, which if performed by a machine cause the machine to perform a method comprising:
receiving, in a logical physical (logPHY) circuit, a flit;
sending, from the logPHY circuit, the flit to a link layer circuit coupled to the logPHY circuit in parallel with checking, in the logPHY circuit, the flit for an error;

detecting, in the logPHY circuit, the error in the flit; and
sending a flit cancel signal to the link layer circuit to cause the link layer circuit to drop the flit.

12. The at least one non-transitory computer readable storage medium of claim 11, wherein the method further comprises:
correcting, in the logPHY circuit, the error in the flit; and
sending the corrected flit to the link layer circuit.

13. The at least one non-transitory computer readable storage medium of claim 11, wherein the method further comprises in response to a determination that the error cannot be corrected, sending a retry request to a remote link partner to re-send the flit.

14. The at least one non-transitory computer readable storage medium of claim 11, wherein the method further comprises sending the flit cancel signal within a predetermined number of cycles following sending the flit to the link layer circuit.

15. An apparatus comprising:
a first link layer circuit to perform link layer functionality for a first communication protocol;
a second link layer circuit to perform link layer functionality for a second communication protocol;
a selection circuit coupled to the first link layer circuit and the second link layer circuit, to provide first information from the first link layer circuit to a logical physical (logPHY) circuit and second information from the second link layer circuit to the logPHY circuit; and
the logPHY circuit coupled to the selection circuit, wherein the logPHY circuit is to communicate with the first link layer circuit in a flit mode in which the first information is communicated in a fixed width size and communicate with the second link layer circuit in a non-flit mode in which the second information is communicated in a variable width size,
wherein when a link is in a partial width mode, the logPHY circuit is to send an early valid indication to the first link layer circuit to enable the first link layer circuit to power up ahead of receipt of a flit from the logPHY circuit.

16. The apparatus of claim 15, wherein the first link layer circuit is to start a flit header in a middle of an output flit and send the output flit with the flit header to the logPHY circuit.

17. The apparatus of claim 15, wherein the logPHY circuit is to receive a retry request from a remote link partner for a first flit, and in response to the retry request, to send an indication to the first link layer circuit to cause the first link layer circuit to send one or more no operation (NOP) flits to the logPHY circuit.

18. The apparatus of claim 15, further comprising a sideband interface coupled between the first link layer circuit and the logPHY circuit to send data link layer packet (DLLP) information.

19. The apparatus of claim 18, wherein the logPHY circuit is to insert at least a portion of the DLLP information into a replay flit and send the replay flit with the at least portion of the DLLP information to a remote link partner.

* * * * *